United States Patent
Wang et al.

(10) Patent No.: US 11,932,927 B2
(45) Date of Patent: Mar. 19, 2024

(54) IRON-BASED METAL POWDER FOR ULTRA-HIGH-SPEED LASER CLADDING, ITS PREPARATION METHOD AND ITS APPLICATION

(71) Applicant: BEIJING NATIONAL INNOVATION INSTITUTE OF LIGHTWEIGHT LTD, Beijing (CN)

(72) Inventors: Miaohui Wang, Beijing (CN); Xueyuan Ge, Beijing (CN); Borui Du, Beijing (CN); Bowen Shen, Beijing (CN); Yifei Xu, Beijing (CN); Ning Xiao, Beijing (CN); Sheng Hao, Beijing (CN)

(73) Assignee: CHINA MACHINERY INSTITUTE OF ADVANCED MATERIALS (ZHENGZHOU) CO., LTD. (CN)

( * ) Notice: Subject to any disclaimer, the term of this patent is extended or adjusted under 35 U.S.C. 154(b) by 341 days.

(21) Appl. No.: 17/135,064

(22) Filed: Dec. 28, 2020

(65) Prior Publication Data
US 2021/0207251 A1    Jul. 8, 2021

(51) Int. Cl.
| | | |
|---|---|---|
| B23K 26/34 | (2014.01) | |
| B22F 1/05 | (2022.01) | |
| B22F 1/065 | (2022.01) | |
| B22F 9/08 | (2006.01) | |
| C22C 38/00 | (2006.01) | |
| C22C 38/02 | (2006.01) | |
| C22C 38/44 | (2006.01) | |
| C22C 38/50 | (2006.01) | |
| C22C 38/54 | (2006.01) | |
| C22C 38/58 | (2006.01) | |

(52) U.S. Cl.
CPC ............. *C22C 38/54* (2013.01); *B22F 1/05* (2022.01); *B22F 1/065* (2022.01); *B22F 9/082* (2013.01); *B23K 26/34* (2013.01); *C22C 38/001* (2013.01); *C22C 38/002* (2013.01); *C22C 38/02* (2013.01); *C22C 38/44* (2013.01); *C22C 38/50* (2013.01); *C22C 38/58* (2013.01); *B22F 2301/35* (2013.01); *B22F 2304/10* (2013.01)

(58) Field of Classification Search
CPC ...... B23K 9/173; B23K 35/383; B23K 9/325; B23K 35/38; B23K 9/16; B23K 2103/04; B23K 2103/10; B23K 9/323; B23K 9/164; B23K 26/348; B23K 9/1735; B23K 10/006; B23K 2101/34; B23K 2103/50; B23K 35/0261; B23K 35/3053; B23K 35/3073; B23K 9/295; B23K 1/0008; B23K 1/0012; B23K 2101/185; B23K 2101/24; B23K 2103/05; B23K 2103/06; B23K 2103/08; B23K 2103/14; B23K 2103/16; B23K 2103/172; B23K 2103/20; B23K 2103/30; B23K 2103/42; B23K 2103/52; B23K 26/0624; B23K 26/26; B23K 26/32; B23K 26/322; B23K 26/40; B23K 28/02; B23K 3/043; B23K 3/08; B23K 35/0255; B23K 35/0266; B23K 35/22; B23K 35/282; B23K 35/286; B23K 35/30; B23K 35/302; B23K 35/306; B23K 35/3086; B23K 35/34; B23K 35/3601; B23K 35/3602; B23K 35/3605; B23K 35/3608; B23K 35/362; B23K 35/368; B23K 35/406; B23K 9/028; B23K 9/0282; B23K 9/044; B23K 9/067; B23K 9/091; B23K 9/0953; B23K 9/1006; B23K 9/1068; B23K 9/1087; B23K 9/123; B23K 9/124; B23K 9/1333; B23K 9/167; B23K 9/235; B23K 9/287; B23K 9/296; B23K 9/32; B23K 9/324; F17C 2205/0373; F17C 2201/0109; F17C 2201/0119; F17C 2201/058; F17C 2205/0111; F17C 2205/0126; F17C 2205/0165; F17C 2205/0323; F17C 2205/0338; F17C 2209/228; F17C 2223/0123; F17C 2223/035; F17C 2250/043; F17C 2270/0545; F17C 2270/0745; A61C 13/20; C21D 9/505; G04D 3/0069; G04D 3/0079; G05D 7/0635; Y10T 29/49318; Y10T 428/211; C22C 38/58; C22C 38/44; C22C 38/02; C22C 38/002; C22C 38/001; C22C 38/54

USPC .......................................................... 219/74
See application file for complete search history.

(56) References Cited

PUBLICATIONS

CN111074268 (Apr. 2020) (Year: Apr. 2020) (Year: 2020).*
CN108130529 (Jun. 2018) (Year: Jun. 2018) (Year: 2018).*
CN109234729 (Jan. 2019) (Year: Jan. 2019) (Year: 2019).*
CN108103499 (Jun. 2018) (Year: Jun. 2018) (Year: 2018).*
CN111607789 (Sep. 2020) (Year: Sep. 2020) (Year: 2020).*
WO2019168893 (Sep. 2019) (Year: Sep. 2019) (Year: 2019).*
CN113056340 (Jun. 2021) (Year: Jun. 2021) (Year: 2021).*
CN108823565 (Nov. 2018) (Year: Nov. 2018) (Year: 2018).*

* cited by examiner

*Primary Examiner* — Nathaniel E Wiehe
*Assistant Examiner* — Frederick F Calvetti

(57) ABSTRACT

An iron-based metal powder for ultra-high-speed laser cladding comprising chemical composition and mass percentage of the metal powder of: C 0.6~1.0%, Cr 17.0~20.0%, Ni 5.0~6.5%, Mn 2.0~4.0%, Mo 1.0~1.5%, Ti 4.0~6.0%, B 1.0~1.5%, N 0.08~0.15%, Si≤0.5%, P≤0.030%, S≤0.030%, balance of Fe and unavoidable impurities, wherein the particle size of the metal powder is 15~65 μm, the fluidity is 16~20 s/50 g.

5 Claims, No Drawings

IRON-BASED METAL POWDER FOR ULTRA-HIGH-SPEED LASER CLADDING, ITS PREPARATION METHOD AND ITS APPLICATION

FIELD

The present invention relates to the field of metal materials, and specifically relates to an iron-based metal powder for ultra-high-speed laser cladding, its preparation method and its application.

BACKGROUND

Laser cladding technology is a surface strengthening process technology, which adds selected cladding materials on the surface of the substrate through different filler methods, and a high-power density laser beam is used to fuse the very thin layer on the surface of the substrate at the same time, and quickly solidify to form a surface cladding layer with dense structure, extremely low dilution, and metallurgical bonding with the substrate, thereby significantly improving the wear resistance, corrosion resistance, heat resistance, oxidation resistance and other characteristics of the base layer surface. In conventional laser cladding technology, because the laser energy primarily acts on the surface of substrate, the powder temperature is lower than the melting point, the heat loss is large, the energy utilization is low, the cladding rate is slow, and the heat-affected zone is large, therefore severely restricts the promotion of laser cladding technology application.

Iron-based metal alloy is an alloy that can withstand various types of corrosion and has a certain strength and toughness. It is a good coating material under wet and corrosive conditions.

SUMMARY

The present disclosure relates to a special iron-based metal powder for ultra-high-speed laser cladding and a cladding process using it. Ultra-high-speed laser cladding is a surface processing technology that uses a high-energy-density beam to melt the additive material and the surface of substrate material moving at a high speed through the synchronous powder feeding method, and quickly solidify to form a dilution rate very low and metallurgically bonded cladding layer with the substrate, which greatly increases the cladding rate, and significantly improves the process characteristics of the surface of substrate material such as wear resistance, corrosion resistance, heat resistance, and oxidation resistance.

The chemical composition and mass fraction of the ultra-high-speed laser cladding iron-based metal corrosion resistant powder of the present disclosure are: C 0.6~1.0%, Cr 17.0~20.0%, Ni 5.0~6.5%, Mn 2.0~4.0%, Mo 1.0~1.5%, Ti 4.0~6.0%, B 1.0~1.5%, N 0.08~0.15%, Si≤0.5%, P≤0.030%, S≤0.030%, balance of Fe and unavoidable impurities.

Although the increase of Cr element can significantly improve the corrosion resistance of the material, too much Cr element will shrink the γ phase region, which is not conducive in obtaining stable austenite. Adding Ni and Mn elements can stabilize austenite. Stainless steel usually has poor hardness and wear-resistance. Therefore, on the basis of iron-based stainless steel materials, by adding Ti, B and other elements, in-situ TiC and TiB2 hard phases are generated for strengthening. The in-situ synthesis of Ti and carbon is an exothermic reaction. As long as less energy is provided, the TiC hard phase can be generated. The generated TiC particles are fine and uniform, the phase interface is clean, and the combination has good industrial application. Compared with other hard phases such as WC and VC, TiC and TiB2 hard phases have better wetting effects and are less prone to micro-cracks. At the same time, other elements are added to jointly improve the strength and refine the structure, and obtain a cladding layer with good wear resistance without cracks, pores and other defects.

Since the laser energy of the ultra-high-speed laser cladding technology primarily acts on the powder, the metal powder used in the cladding process has a vital influence on the cladding effect. The particle size range, fluidity, sphericity and other parameters directly affect the quality of the cladding layer. The following indicators are typically used: (1) The particle size range refers to the size of metal powder particles usually characterized by the diameter of the particles. (2) The fluidity is expressed in terms of the time required for a certain amount of powder to flow through a standard funnel with a specified aperture. The unit is typically s/50 g. the smaller the value, the better the fluidity of the powder is. (3) The spherity refers to the degree to which the shape of the particle is similar to that of a sphere. (4) D50 is an index describing the particle size distribution of powder, which refers to the particle size corresponding to the cumulative particle size distribution percentage of a sample reaching 50%.

Optionally, a sphericity of the powder is greater or equal to 90%, and a fluidity is 16~20 s/50 g. Optionally, a particle size distribution of the powder is 15~65 μm.

Optionally, a D50 of the powder is 25~40 μm.

Optionally, an oxygen content is less than or equal to 200 ppm.

According to another aspect of the present disclosure, a method for preparing the above-mentioned powder is provided, which is characterized in that: composition of raw materials is alloyed and proportioned, and then vacuum smelting is carried out, using intermediate frequency induction heating to melt, and a vacuum degree of a melting chamber is $10^{-1}$~$10^{-2}$ Pa, the powder is made by gas atomization method, an argon pressure of powder spraying gas is 1.2~3.8 MPa, after receiving the powder, perform particle size screening, and the metal powder in the particle size range of 15~65 μm can be screened, to obtain iron-based metal powder for ultra-high-speed laser cladding.

The control of the degree of vacuum pressure has a significant impact on the oxygen content of the powder and other indicators. The pressure control of the powder spraying gas argon is the core parameter to control the particle size, sphericity and powder formation rate of the powder. It needs to be accurately adjusted according to the liquid flow situation and each powder spraying period.

According to another aspect of the present disclosure, applying the above-mentioned iron-based alloy powder, using ultra-high-speed laser cladding technology, combined with different processes, to strengthen and repair the surface of substrate, the specific steps are:

(1) machining a surface of substrate;
(2) wiping the surface of substrate with acetone to remove surface grease;
(3) carrying out laser cladding path planning according to a geometry of the surface of substrate, and formulating process parameters; wherein a semiconductor laser cladding system is used to clad and repair the surface of substrate with the following process parameters: laser power 1500~2500 W, spot diameter 0.8~1.2 mm, powder feeding rate 2~5 kg/h, laser scanning rate 330~830 m/min, overlap rate 40%~70%, and single layer cladding thickness 250~500 μm, a laser cladding head has an argon gas protection function, and an argon gas flow rate is 8~20 L/min; and (4) using CNC machine tools to machine the repaired substrate surface to obtain the required size.

Compared with the prior art, the present disclosure has the following advantages:

1. The metal powder has an optimal alloy content configuration, which can form a dense and compact repair coating combined with the substrate through the laser cladding process, the alloy element distribution is more uniform, the corrosion resistance of the surface of substrate is improved, the corrosion rate is reduced, and the service life is increased.
2. Ultra-high-speed laser cladding technology can greatly increase the processing speed of laser cladding surfaces, and obtain a cladding layer with a smooth surface, without porosity and cracks. This technology has special requirements for metal powder particle size, fluidity, and other indicators. The iron-based stainless steel powder for ultra-high rate laser cladding involved in the present disclosure is suitable for the processing technology.
3. Compared with traditional laser cladding technology, ultra-high-speed laser cladding has higher laser beam energy density and better powder convergence, therefore high-speed cladding can be achieved under the condition of laser scanning rate above 330 mm/s. At the same time, due to the higher scanning speed, the dilution rate of ultra-high-speed laser cladding is less than 2%.

DETAILED DESCRIPTION OF THE INVENTION

The present disclosure will be further described in conjunction with Examples and Comparative Examples. The mass fractions of each element in the Examples and Comparative Examples are shown in Table 1, and the performance parameters are shown in Table 2. The main process parameters and cladding quality used in the Examples and Comparative Examples are shown in table 3.

TABLE 1 shows the composition (mass fraction, %) of iron-based metal powder for ultra-high-speed laser cladding.

| Examples | C | Cr | Ni | Mn | Mo | Ti | B | Si | P, S | N | Fe |
|---|---|---|---|---|---|---|---|---|---|---|---|
| Example 1 | 0.8 | 19.0 | 5.65 | 3.2 | 1.2 | 5.0 | 1.2 | 0.1 | ≤0.03 | 0.1 | Bal. |
| Example 2 | 0.7 | 18.0 | 5.8 | 3.1 | 1.4 | 5.5 | 1.4 | 0.1 | ≤0.03 | 0.1 | Bal. |
| Comparative Example 1 | 0.8 | 19.0 | 5.65 | 3.2 | 1.2 | 5.0 | 1.2 | 0.1 | ≤0.03 | 0.1 | Bal. |
| Comparative Example 2 | 0.8 | 19.0 | 5.65 | 3.2 | 1.2 | 5.0 | 1.2 | 0.1 | ≤0.03 | 0.1 | Bal. |

TABLE 2 shows the performance parameters (mass fraction, %) of iron-based metal powder for ultra-high-speed laser cladding.

| Examples | Particle μm | Fluidity s/50 | Gsphericity % | $D_{50}$/μm |
|---|---|---|---|---|
| Example 1 | 15~65 | 18 | 91 | 32 |
| Example 2 | 15~65 | 16 | 95 | 34 |
| Comparative Example 1 | 50~150 | 13 | 89 | 95 |
| Comparative Example 2 | 15~65 | 18 | 91 | 32 |

TABLE 3 shows the comparison between ultra-high-speed laser cladding and traditional laser cladding.

| Examples | Equipment model | Laser power/W | Laser scanning rate/mm/s | Beam diameter/mm | Dilution rate | Cladding layer quality |
|---|---|---|---|---|---|---|
| Example 1 | High-speed cladding equipment | 1600 | 500 | 1 | 2% | The surface quality of the cladding layer is good, forming a metallurgical bond |
| Example 2 | High-speed cladding equipment | 1550 | 417 | 1 | 2% | The surface quality of the cladding layer is good, forming a metallurgical bond |
| Comparative Example 1 | Traditional cladding equipment | 2250 | 12 | 3 | 25% | The surface quality of the cladding layer is good, forming a metallurgical bond |
| Comparative Example 2 | Traditional cladding equipment | 5000 | 417 | 3 | — | The surface quality of the cladding layer is poor, and the substrate and the powder have not formed a metallurgical bond |

Example 1

Optionally, a method for preparing the above-mentioned powder is characterized in that: composition of raw materials is alloyed and proportioned, and then vacuum smelting is carried out, and a vacuum degree of a melting chamber is set to $10^{-1} \sim 10^{-2}$ Pa, the powder is made by gas atomization method, an argon pressure of powder spraying gas is set to 1.2~3.8 MPa. After receiving the powder, particle size screening is performed, and the metal powder in the particle size range of 15~65 μm is selected through screening, to obtain iron-based metal powder for ultra-high-speed laser cladding.

Optionally, an iron-based metal powder is provided, the mass fraction of each element is: C 0.8%, Cr 19.0%, Ni 5.65%, Mn 3.2%, Mo 1.2%, Ti 5.0%, B 1.2%, N 0.09%, Si≤0.5%, P≤0.030%, S≤0.030%, balance of Fe and unavoidable impurities.

The metal powder has a particle size of 15~65 μm, a fluidity is 18 s/50 g, a sphericity is greater than or equal to 91%, and a D50 is 32 μm.

Optionally, the powder contains 160 ppm oxygen. The hollow powder rate is less than 1%.

Subsequently, apply the sieved powder, use ultra-high-speed laser cladding technology, and match the corresponding process to repair the surface of substrate.

Optionally, the repair method is to machine the surface of substrate.

Wipe the surface of mold to be repaired with acetone to remove surface grease.

Carry out the path planning of ultra-high-speed laser cladding according to a geometry of the surface of substrate and formulate process parameters.

Use semiconductor laser cladding system to clad and repair the surface of substrate, using the above process parameters: laser power 1700 W, spot diameter 1 mm, powder feeding rate 2.4 kg/h, laser scanning rate 500 mm/s, overlap rate 55%, and single layer cladding thickness 320 μm, the laser cladding head has an argon gas protection function, and the argon gas flow rate is 10 L/min.

CNC machine tools are used to machine the repaired substrate surface to obtain the required size and good surface properties.

Example 2

Optionally, a method for preparing the above-mentioned powder is characterized in that: composition of raw materials is alloyed and proportioned, and then vacuum smelting is carried out, and a vacuum degree of a melting chamber is set to $10^{-1} \sim 10^{-2}$ Pa, the powder is made by gas atomization method, an argon pressure of powder spraying gas is set to 1.2~3.8 MPa. After receiving the powder, perform particle size screening, and the metal powder in the particle size range of 15~65 μm is selected through screening to obtain iron-based metal powder for ultra-high-speed laser cladding.

Optionally, an iron-based metal powder is provided, the mass fraction of each element is: C 0.7%, Cr 18.0%, Ni 5.8%, Mn 3.1%, Mo 1.4%, Ti 5.5%, B 1.2%, N 0.09%, Si≤0.5%, P≤0.030%, S≤0.030%, balance of Fe and unavoidable impurities.

The metal powder has a particle size of 15~65 μm, a fluidity is 18 s/50 g, a sphericity is greater than or equal to 95%, and a D50 is 34 μm.

Optionally, the powder contains 160 ppm oxygen. The hollow powder rate is less than 1%.

Apply the sieved powder, use ultra-high-speed laser cladding technology, and match the corresponding process to repair the surface of substrate.

Optionally, the repair method is to machine the surface of substrate.

Wipe the surface of mold to be repaired with acetone to remove surface grease.

Carry out the path planning of ultra-high-speed laser cladding according to a geometry of the surface of substrate and formulate process parameters.

Use semiconductor laser cladding system to clad and repair the surface of substrate, using the above process parameters: laser power 1550 W, spot diameter 1 mm, powder feeding rate 2.2 kg/h, laser scanning rate 417 mm/s, overlap rate 60%, and single layer cladding thickness 300 μm, the laser cladding head has an argon gas protection function, and the argon gas flow rate is 10 L/min.

CNC machine tools are used to machine the repaired substrate surface to obtain the required size and good surface properties.

Comparative Example 1

Optionally, a method for preparing the above-mentioned powder is characterized in that: composition of raw materials is alloyed and proportioned, and then vacuum smelting is carried out, and a vacuum degree of a melting chamber is set to $10^{-1} \sim 10^{-2}$ Pa, the powder is made by gas atomization method, an argon pressure of powder spraying gas is set to 1.2~3.8 MPa, after receiving the powder, perform particle size screening, and the metal powder in the particle size range of 50~150 μm can be selected through screening to obtain iron-based metal powder for ultra-high-speed laser cladding.

Optionally, an iron-based metal powder with the same composition and content as in Example 1 comprises mass fraction of each element as follow: C 0.8%, Cr 19.0%, Ni 5.65%, Mn 3.2%, Mo 1.2%, Ti 5.0%, B 1.2%, N 0.09%, Si≤0.5%, P≤0.030%, S≤0.030%, balance of Fe and unavoidable impurities.

The metal powder has a particle size of 50~150 μm, a fluidity is 13 s/50 g, a sphericity is greater than or equal to 89%, and a D50 is 95 μm.

Optionally, the powder contains 190 ppm oxygen. The hollow powder rate is less than 1%.

Apply the sieved powder, use ultra-high-speed laser cladding technology, and match the corresponding process to repair the surface of substrate.

Optionally, the repair method is to machine the surface of substrate.

Wipe the surface of mold to be repaired with acetone to remove surface grease.

Carry out traditional laser cladding path planning according to a geometry of the surface of substrate, and formulating process parameters.

Use semiconductor laser cladding system to clad and repair the surface of substrate, using process parameters: laser power 2250 W, spot diameter 3 mm, powder feeding rate 2.4 kg/h, laser scanning rate 12 mm/s, overlap rate 55%, and single layer cladding thickness 980 μm, the laser cladding head has an argon gas protection function, and the argon gas flow rate is 10 L/min.

CNC machine tool is used to machine the repaired substrate surface to obtain the required size and good surface properties, but the cladding layer dilution rate is high, and the alloy element content of the cladding layer is significantly lower than that of Example 1 and the powder composition.

Comparative Example 2

Optionally, a method for preparing the above-mentioned powder is provided is characterized in that: composition of raw materials is alloyed and proportioned, and then vacuum smelting is carried out, and a vacuum degree of a melting chamber is set to $10^{-1}$~$10^{-2}$ Pa, the powder is made by gas atomization method, an argon pressure of powder spraying gas is set to 1.2~3.8 MPa. After receiving the powder, perform particle size screening, and the metal powder in the particle size range of 15~65 μm is selected through screening, to obtain iron-based metal powder for ultra-high-speed laser cladding.

Optionally, An iron-based metal powder with the same composition and content as in Example 1 is provided with the mass fraction of each element as follow: C 0.8%, Cr 19.0%, Ni 5.65%, Mn 3.2%, Mo 1.2%, Ti 5.0%, B 1.2%, N 0.09%, Si≤0.5%, P≤0.030%, S≤0.030%, balance of Fe and unavoidable impurities.

The metal powder has a particle size of 15~65 μm, a fluidity is 18 s/50 g, a sphericity is greater than or equal to 91%, and a D50 is 32 μm.

Optionally, the powder contains 160 ppm oxygen. The hollow powder rate is less than 1%.

Apply the sieved powder, use ultra-high-speed laser cladding technology, and match the corresponding process to repair the surface of substrate.

Optionally, the repair method is to machine the surface of substrate.

Wipe the surface of mold to be repaired with acetone to remove surface grease.

Carry out traditional laser cladding path planning according to a geometry of the surface of substrate, and formulating process parameters.

Use optical fiber laser cladding system to clad and repair the surface of substrate, with the process parameters described in Table 3: laser power 5000 W, spot diameter 3 mm, powder feeding rate 2.4 kg/h, laser scanning rate 417 mm/s, and overlap rate 55%, the laser cladding head has an argon gas protection function, and the argon gas flow rate is 10 L/min.

Using traditional laser cladding technology, when the laser scanning rate is 417 mm/s, the laser power is increased from 2250 W to 5000 W. However, it does not achieve a well-shaped cladding layer, and the powder and the substrate did not form a good metallurgical bond.

The above are only preferred specific implementations of the present disclosure. The scope of protection of the present disclosure is not limited to the present disclosure. Any changes or substitutions that can be easily conceived by those skilled in the art within the scope of the technology disclosed in the present disclosure shall be covered by the scope of protection of the present disclosure. Therefore, the scope of protection of the present disclosure should be subject to the scope of the protection of the claims.

The invention claimed is:

1. An ultra-high-speed laser cladding process using an iron-based metal powder, comprising:
   machining a surface of substrate;
   wiping the surface of substrate with acetone to remove surface grease;
   carrying out laser cladding path planning according to a geometry of the surface of substrate,
   formulating process parameters; and
   using Computerized Numerical Control (CNC) machine tools to machine the repaired substrate surface to obtain the required size;
   wherein a semiconductor laser cladding system is used to clad and repair the surface of substrate with the following process parameters: laser power 1500~2500 W, spot diameter 0.8~1.2 mm, powder feeding rate 2~5 kg/h, laser scanning rate 330~830 m/min, overlap rate 40%~70%, and single layer cladding thickness 250~500 μm, wherein a laser cladding head with an argon gas protection function is used, and wherein an argon gas flow rate of 8~20 L/min is used,
   wherein the iron-based metal powder comprises: C at 0.6~1.0%, Cr at 18.0~20.0%, at Ni 5.0~6.5% at Mn 2.0~4.0%, at Mo 1.0~1.5%, Ti at 4.0~6.0%, B at 1.0~1.5%, N at 0.08~0.15%, Si at ≤0.5%, P at ≤0.030%, S at ≤0.030%, balance of Fe and unavoidable impurities.

2. The ultra-high-speed laser cladding process using the iron-based metal powder according to claim 1, wherein a sphericity of the powder is greater or equal to 90%.

3. The ultra-high-speed laser cladding process using the iron-based metal powder according to claim 2, wherein a particle size distribution of the powder is 15~65 μm.

4. The ultra-high-speed laser cladding process using the iron-based metal powder according to claim 3, wherein a D50 of the powder is 25~40 μm.

5. The ultra-high-speed laser cladding process using the iron-based metal powder according to claim 4, wherein the powder has a fluidity of 16~20 s/50 g and an oxygen content is less than or equal to 200 ppm.

* * * * *